June 20, 1961

J. J. OLSON ET AL 2,989,632

OZONE CIRCULATOR

Filed Feb. 27, 1959

INVENTORS
WALLACE A. MONSON & JOHN J. OLSON
BY
ATTORNEY

United States Patent Office 2,989,632
Patented June 20, 1961

2,989,632
OZONE CIRCULATOR
John J. Olson and Wallace A. Monson, Minneapolis, Minn., assignors to Standard Packaging Corporation, a corporation of Virginia
Filed Feb. 27, 1959, Ser. No. 796,094
4 Claims. (Cl. 250—46)

This invention relates to new and useful improvements in ozone circulators and more particularly in a circulator for drawing a uniform flow of inlet air over a source of ultraviolet light for the production of ozone and then dispersing the ozone laden air in an annular pattern from the periphery of the circulator.

Since the introduction of small mercury vapor lamps for producing ultraviolet light, several devices have appeared on the market using the principle of creating ozone by exposing surrounding air to ultraviolet light. The ozone thus produced is used to oxidize odor particles in the air as well as providing an effective germicidal agent. Devices of this nature can be used to provide effective odor control in single room areas such as business offices or household rooms as kitchens, dining areas, wash rooms, basements, closets and the like.

Most air purifiers using the ozone principle, that are presently on the market, consist of fixtures for housing an ultraviolet lamp and allowing the ozone laden air to circulate by convection. A few devices have appeared which circulate the ozone by a conventional fan with a plate mounted behind the grill. As such the air containing ozone is expelled in a direct pattern extending either vertically above or horizontally out from the circulator. While this method of dispersing air is satisfactory for standard air cooling circulators, it fails to provide a uniform circulation of air throughout the entire room in which the circulator is located. The advantage of utilizing ozone as a germicidal and odor oxidizing agent resides in the fact that it may be circulated in the air and can thus get around and under objects in all parts of the room. It is thus very important that the ozone be dispersed completely throughout the area in which it is desired to control odors and spread germicidal agents.

The instant invention is directed to this need by providing a small ozone circulator which circulates air over an ultraviolet light source concealed within a housing and then dispersing the resultant ozone laden air throughout the room in which the device is used. An annular periphery outlet at the top of the fan provides uniform dispersal of outlet air currents and eliminates the necessity of adjusting louvers or ventilating fins. A further advantage over prior art devices resides in the disposition of the ultraviolet light lamps. In all prior art devices it has been necessary to expose the ultraviolet light source to view in order to accomplish maximum circulation. Such a condition is harmful to the eyes in the event of over exposure to ultraviolet rays. In the instant invention the ultraviolet lamps are well hidden from view within the circulator housing.

It is therefore an object of this invention to provide a new and useful ozone circulator that dispenses ozone laden air over the upper periphery of the circulator.

A further object of this invention is to provide a new and useful ozone circulator that utilizes centrifugal force to expel air in a circular pattern from the top of the device.

A further object of this invention is to provide a new and useful ozone circulator that has a diffusing member to concentrically disperse outlet air from the top of the circulator.

A still further object of this invention is to provide a new and useful ozone circulator having means for introducing inlet air into a circulator in uniform pattern for exposure to ultraviolet light within the circulator.

A still further object of this invention is to provide a new and useful ozone circulator which substantially conceals the ultraviolet light rays from view.

A still further object of this invention resides in the specific structural details of the circulator including intake means at the bottom of the housing for introducing air in a circular pattern and a diffuser and impeller for centrifugal emission of ozone-laden air along the periphery at the top of the circulator.

Other objects of this invention are thus inherent and apparent in the apparatus as described, pictured and claimed.

To the accomplishment of the foregoing ends this invention comprises the features hereinafter fully described and particularly pointed out in the claims and the following description setting forth in detail certain illustrative embodiments of the invention, these being indicative of but a few of the ways in which the principle of the invention may be employed.

This invention will be described with reference to the several figures of the drawings and which corresponding numerals refer to the same parts and in which.

Figure 1:
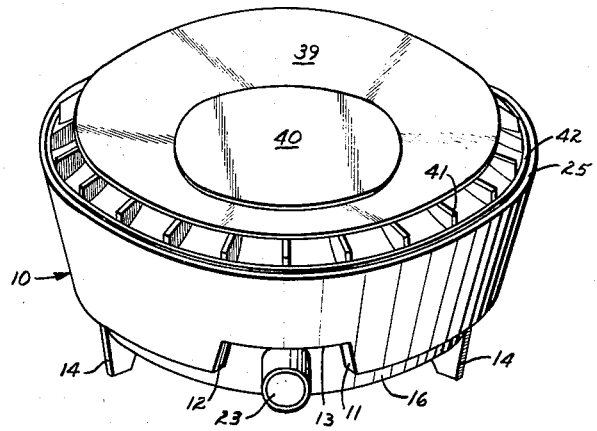
FIG. 1 is a perspective view of the ozone circulator.
Figure 2:
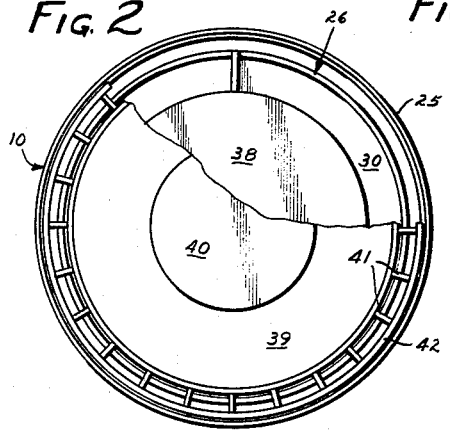
FIG. 2 is a top plan view partially broken away.
Figure 3:
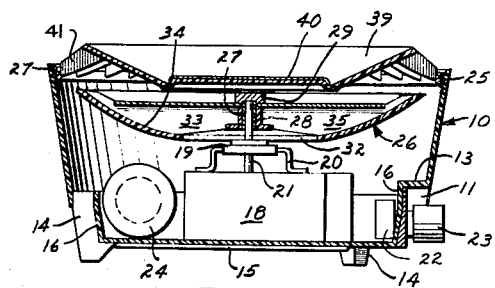
FIG. 3 is a transverse vertical cross section of the device showing the arrangement of the electrical components, the impeller and diffuser.

Referring now to the drawings and particularly FIGURES 1 and 3, there is shown a housing 10 which is in the configuration of a hollow frusto-conical shaped cylinder having a slightly greater circumference at the top than at the bottom. The particular shape of the housing assists in orienting the inlet air stream over the ultraviolet light source and for dispersal out of the circulator as hereinafter explained. It also provides the circulator with a pleasing appearance. Any suitable material such as aluminum, light metals or the thermoplastics may be used to fabricate the housing and its component parts with the exception of the elements of the electrical circuit. In the instant invention plastic was found to be practical because of its economy in molding, its lightness and durability.

An indented portion formed by spacers 11 and 12 and a top wall 13 are disposed along the lower periphery of the housing 10 to provide access to a switch 22 for control of the electrical system. Also disposed in the lower periphery of the housing are a series of V-shaped supporting legs 14, the apex thereof being integrally joined to the inner wall of the housing. The legs 14 depend from the housing 10 to support the circulator on a flat surface, as best shown in FIGURE 3. Alternately interspaced with legs 14 are a series of small rectangular bosses (not shown in the drawing) which are integrally joined to and extend inwardly from the inner walls of the housing.

Figure 5:
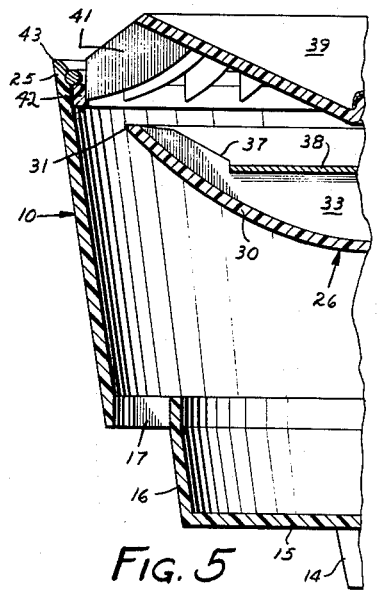
FIG. 5 is a fragmentary vertical sectional view of a portion of the housing showing the inlet air means and the peripheral areas of the impeller and the diffuser.
Figure 4:
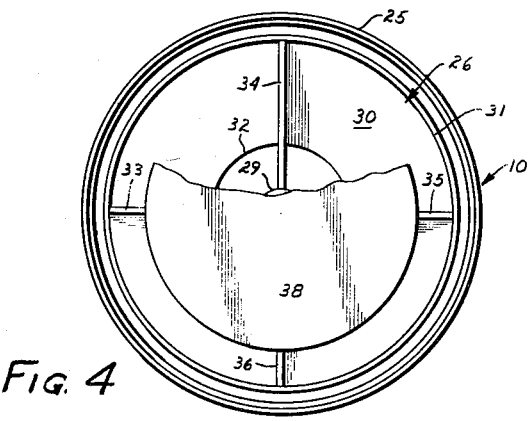
FIG. 4 is a top plan view partially broken away showing the impeller seated within the top of the housing.

The inner edges of spacers 11 and 12, legs 14 and the rectangular bosses serve to space and suspend circulator base 15 in concentric relationship below the bottom of housing 10. The periphery of base 15 is joined by and encircled by a vertical annular wall 16 which extends upwardly to a point in spaced relationship with the lower end of the inner wall of housing 10 as best shown in FIGURE 5. Wall 16 is secured in suspended position by integral attachment to spacers 11 and 12, legs 14 and the rectangular bosses. A concentric intake aperture 17 extending substantially 360 degrees is thus formed between wall 16 and the inner wall at the bottom of the housing. The concentric position of aperture 17 allows an inlet air stream to enter the housing in a circular pattern over base 15. Inasmuch as the source of ultraviolet light is seated in the base, the inlet air is immediately exposed to ultraviolet light rays and continues to be exposed until dispersed through the impeller.

The suspended position of base 15 and its angular wall 16 forms a cup-shaped configuration at the bottom of housing 10 for seating the electrical system as shown in Figure 3. This system comprises an A.C. induction motor 18, suitably mounted on base 15 which rotates a vertical impeller shaft 21. A bearing 19 is mounted by a U-shaped clip 20 above the motor to guide rotation of the shaft 21. The shaft extends up from the motor coaxial with the vertical axis of the housing. A switch 22 is mounted on the inner surface of wall 16 and is actuated by control knob 23 mounted on the outer surface of wall 16 midway between spacers 11 and 12 and below wall 13. A pair of ultraviolet lamps 24, together with appropriate sockets, are mounted in face to face relationship on base 15 at one end of motor 18. The cross sectional view of Figure 3 shows only one of the lamps 24, the second lamp being disposed immediately forward of the cross section.

Any suitable ozone producing mercury vapor lamp such as Westinghouse Odor-Out Bulb 794-8 or General Electric Bulb Oz 4811 may be used. Lamps of this type emit in part an ultraviolet radiation of approximately 1849 Angstrom units to produce ozone on striking the oxygen in the surrounding atmosphere and in the instant case the inlet air stream converging within housing 10 from intake aperture 17. The resulting ozone oxidizes odor particles and bacteria upon being circulated in the air.

A removable access plate, not shown in the drawing, may be inlaid within base 15 between lamps 24 so that the lamps may be easily replaced when burned out.

The motor 18 and lamps 24 are connected in series across a 110 volt A.C. supply. Usually an inductive ballast or resistor is used in the lamp circuit to provide the optimum operating voltage. Heretofore standard lamp ballasts designed for 115-125 volt supply circuits have been a necessary element of the circuit supplying the ozone lamps such as lamps 24. However, in designing the circuit for the instant circulator, the lamps 24 were connected in series with the field coil of motor 18 so that the coil acted as the ballast. Thus, the necessity of adding a separate ballast or resistor to the circuit was eliminated.

With reference now to the circulating means, the impeller shaft 21 extends up from motor 18 coaxially with the vertical axis of the circulator to a point in spaced relation below the horizontal plane of the brim 25 at the top of housing 10. A hollow impeller generally designated 26 is secured for rotation to the upper end of shaft 21 by a ferrule 27 forcibly inserted in axial housing 28 as shown in Figure 3. A hub 29 secured at the top of impeller 26 and ferrule 27 has a conventional set screw for tightening the impeller to shaft 21. Impeller 26 comprises a dished-shaped base 30 with its periphery 21 terminating in spaced relation from brim 25 best shown in Figure 5. It is readily seen that the impeller 26 is substantially coextensive with the upper end of housing 10 and as such effectively blocks untraviolet light rays from escaping out of the top of the housing.

An intake port 32 is provided at the center of the dished-shaped base 30 coaxial with shaft 31 to allow the inlet air stream drawn up through the intake aperture 17 at the bottom of the housing to enter the impeller 26. A plurality of impeller blades 33 and 36 spaced at right angles to each other are integrally joined to the upper surface of dished base 30 and extend radially from the center of the impeller to the periphery 31. The inner portion of the blades are tapered from their junctures with the rim of port 32 inwardly to their point of attachment with axial housing 28 at the center of the impeller. The outer ends of the blades joining periphery 31 form an enlarged blade tip 37, shown in Figure 5, to give an additional propellant force to the air mass as it escapes impeller 26. An aluminum reflector disc 38, which is of lesser diameter than dished base 30, is seated over the upper edges of blades 33—36 and secured in place by hub 29. Disc 38 is thus seated in spaced relation within and below periphery 31 forming an open concentric area at the outer portion of dished base 30 for dispersement of the outlet air stream created by blades 33—36 upon rotation of the impeller. The disc 31 acts as a baffle to contain air within the impeller and assist in guiding the outlet air stream towards periphery 31 as hereinafter explained. The aluminum surface of the disc serves as a reflecting area to reflect any ultraviolet rays that extend into the impeller through port 32. The ultraviolet rays are reflected within the enclosed portion of the impeller formed between base 30 and disc 38 to expose the air currents to the direct and reflected rays of ultraviolet light after entrance into the impeller. Thus, as the air currents circulate within the circulator they are constantly exposed to ozone forming ultraviolet rays.

As impeller 26 is rotated by impeller shaft 21, an area of low pressure is created by blades 33—36 in the vicinity of axial housing 28 above intake port 32. The low pressure center causes ambient air to form an inlet air stream which enters the housing in circular pattern through aperture 17. The circular pattern of the inlet air stream provides maximum exposure to the ultraviolet rays of lamps 24 for the creation of ozone. The inlet air stream continues to flow toward the low pressure center in impeller 30 where it is exposed to blades 33—36 and the centrifugal force created by the rotation of the impeller. The centrifugal force forces the air mass out between the surfaces of dished base 30 and disc 38 through periphery 31. It is readily seen that the dished contour of base 30 forms an outlet air stream that escapes the impeller between periphery 31 and disc 38 adjacent the brim 25. The outlet air stream will be of annular pattern having an acute angle of escapement relative to the vertical axis of housing 10. The centrifugal force imparted by the impeller 26 allows the outlet air stream to form a funnel-like contour above brim 25 for complete dispersement of ozone laden air throughout the area in which the circulator is located.

A diffuser 39 assists the impeller in forming the circular pattern of the outlet air stream and also serves as an enclosure over the housing to block the glow from the ultraviolet rays reflected by disc 38. Diffuser 39 is of concave contour with a flat center 40 and is disposed coextensively with the brim 25 of housing 10. By referring to Figure 5 it is seen that the angle of the periphery of the convex diffuser is complementary to the angle of periphery 31 of the impeller to form an annular channel for guiding the escapement of the outlet air stream. A plurality of vanes 41 depending from the periphery of diffuser 39 are integrally joined to and seated on a circular rim 42 which in turn is seated on a plurality of small lugs (not shown in the drawings) on the inner surface of housing 10 adjacent brim 25. Vanes 41 provide a diffusing effect that decrease the tendency of the outlet air stream to escape in a whirling pattern due to the rotation of the impeller. A resilient ring 43 is seated over rim 42 to secure diffuser 39 in place.

It is to be understood that the specific embodiments described above are given by way of example only and the invention is limited only by the terms of the appended claims.

We claim:
1. A cylindrical ozone circulator in which the parts are arranged to allow an inlet air stream to pass vertically in a circular pattern through a substantial part of said cir- culator and over a source of ultraviolet light and having; a rotatable shaft coaxial with the vertical axis of said circulator; a plurality of blades rotatably secured to said shaft in the path of the inlet air stream for transposing the same to an outlet air stream, said blades extending radially from said shaft to a point adjacent the brim of said circulator; a dished-shaped base at the bottom of said blades and rotatable therewith having an opening concentric about said shaft to allow the inlet air stream to pass through to said blades, the periphery of said base having the same radial extension from said shaft as said blades, a planar disc of lesser diameter than said base disposed over the top of said blades forming a hollow casing with said base enclosing a portion of said blades to form a channel for guiding the outlet air stream urged outwardly by the centrifugal force formed upon the rotation of said blades and base toward the periphery of said base; and means above said disc to guide the outlet air stream from the brim of said circulator in circular pattern.

2. An apparatus for circulating ozone comprising; a housing; a hollow cylindrical base concentrically suspended in spaced relation to the lower end of said housing for allowing an inlet air stream to pass between said housing and base; ultraviolet lamps for producing ozone mounted in said base to expose the air in said housing to ultraviolet light rays; a dished-shaped impeller positioned for rotation in the upper portion of said housing, said impeller having a plurality of blades for creating an outlet air stream upon the rotation thereof; a planar member disposed over a portion of the blades of said impeller and rotatable therewith for guiding the outlet air stream toward the periphery of said impeller, said planar member having a reflective surface for downward reflection of ultraviolet light rays entering said impeller from said lamps; and a concave diffuser coextensively disposed over the top of said housing and having a plurality of depending spaced vanes joining the brim of said housing for diffusing outlet air passing therethrough.

3. An ozone circulator comprising; a hollow cylindrical housing; a cylindrical base concentrically suspended in spaced relation to the lower end of said housing to allow an inlet air stream to pass between said housing and base; ozone producing ultraviolet lamps mounted on said base for exposing the inlet air stream to ultraviolet light rays; a rotatable vertical shaft disposed along the vertical axis of said housing and connected at its lower end to means for rotating the same; an impeller rotatably mounted at the upper end of said shaft substantially coextensive with the upper portion of said housing, said impeller having a circular dished-shaped base, the periphery thereof disposed at an acute angle relative to the vertical axis of said housing and terminating in spaced relation to the brim of said housing, a plurality of blades integrally joined to the upper surface of the dished-shaped base for rotation therewith and transposing the inlet air stream into an outlet air stream and a planar disc disposed over a portion of the top of the blades forming a hollow chamber with the dished-shaped base to guide the outlet air stream, urged outwardly by the centrifugal force formed upon the rotation of said impeller, toward the periphery of the dished-shaped base; a concave circular diffuser coextensive with the top of said housing and disposed in spaced relation above said impeller, the periphery of said diffuser disposed at substantially the same acute angle relative to the vertical axis of said housing as the periphery of the dished-shaped base of said impeller for forming an annular channel therewith adjacent the brim of said housing to disperse outlet air therefrom, said diffuser having a plurality of depending spaced vanes joining the brim of said housing for diffusing the outlet air; and resilient means to secure said diffuser to the brim of said housing.

4. An apparatus for circulating ozone comprising; a hollow cylindrical housing; a concave closure member positioned over the top of said housing, the periphery thereof extending upward at an acute angle relative to the vertical axis of said housing, said closure member having a plurality of diffuser vanes depending from the periphery thereof for seating on the upper edge of said housing; a hollow rotatable air circulating member mounted immediately below said closure member having a circular dish-shaped bottom open at the center, the periphery of the bottom terminating in spaced relationship with the periphery of said closure member and extending upward at substantially the same angle as the periphery of said closure member forming a channel therewith for the emission of air currents generated by said air circulating member, said air circulating member having further a plurality of impeller blades integral with the dish-shaped bottom and seated thereon and a circular planar reflector mounted over the blades and having a diameter substantially the same as the dish-shaped bottom; a cylindrical base suspended in concentric spaced relationship from the bottom of said housing for allowing air to enter said housing in a circular pattern; an electric motor mounted on the base and connected to said air circulator by a shaft for rotation of the same; and ozone producing lamps mounted adjacent said motor for casting ultraviolet light up through said housing and against the reflector of said air circulator member.

References Cited in the file of this patent

UNITED STATES PATENTS

| | | |
|---|---|---|
| 2,549,087 | Harshbarger | Apr. 17, 1951 |
| 2,553,711 | Jackson | May 22, 1951 |
| 2,638,644 | Rauhut | May 19, 1953 |
| 2,732,501 | Blaeker | Jan. 24, 1956 |